(12) United States Patent
Trimble (10) Patent No.: US 6,419,245 B1
(45) Date of Patent: Jul. 16, 2002

(54) TRANSPORT VEHICLE FOR POST AUGER, POST AUGER SUPPORT STAND THEREFOR AND METHODS OF MAKING THE SAME

(76) Inventor: Ross S. Trimble, 2207 State Hwy. 176 E., Spokane, MO (US) 65754

( * ) Notice: Subject to any disclaimer, the term of this patent is extended or adjusted under 35 U.S.C. 154(b) by 16 days.

(21) Appl. No.: 09/713,823

(22) Filed: Nov. 15, 2000

(51) Int. Cl.⁷ .................................................. B62B 1/00
(52) U.S. Cl. ...................... 280/79.11; 280/35; 175/162; 269/17
(58) Field of Search ................................ 248/670, 671, 248/676, 121, 129, 132, 125.8; 280/79.11, 79.2, 79.3, 79.6, 79.7, 47.34, 47.35, 35, 638, 639; 175/162, 323; 269/17; 254/134

(56) References Cited

U.S. PATENT DOCUMENTS

| | | | |
|---|---|---|---|
| 4,848,717 A | 7/1989 | Bevill | 248/670 |
| 4,932,628 A | 6/1990 | Pacheco | 248/676 |
| 4,979,578 A * | 12/1990 | Landry | 175/162 |
| 5,014,961 A | 5/1991 | Ferguson | 248/670 |
| 5,505,425 A * | 4/1996 | Shelton | 248/670 |
| 5,556,064 A * | 9/1996 | Cowe | 248/670 X |
| 5,586,743 A | 12/1996 | Sodolak | 248/671 |
| 5,678,801 A | 10/1997 | Billingsley | 248/676 |
| 6,338,758 B1 * | 1/2002 | Curran | 248/129 X |

* cited by examiner

Primary Examiner—Brian L. Johnson
Assistant Examiner—Bryan Fischmann
(74) Attorney, Agent, or Firm—Richard L. Marsh (57) ABSTRACT

A post auger storage stand has a transverse base, a longitudinal arm and a movable yoke support having a pair of adjustable vertical column members for receiving a yoke of a post auger thereon wherein the movable yoke support is affixed to a slidable sleeve movable along the longitudinal arm to adjust for different sized post augers. The post auger stand may additionally have wheel members affixed to the transverse base and on a steerable axle pivotally mounted in the longitudinal arm wherein the post auger stand may be readily moved into position under a raised post auger mounted on a tractor and aligned for receiving the post auger on the post auger stand.

17 Claims, 4 Drawing Sheets

TRANSPORT VEHICLE FOR POST AUGER, POST AUGER SUPPORT STAND THEREFOR AND METHODS OF MAKING THE SAME

BACKGROUND OF THE INVENTION

1. Field of the Invention

This invention relates to a transport and storage vehicle for a post auger and more specifically for a post auger adapted for mounting on a three-point hitch of a tractor.

2. Prior Art Statement

Currently, the operator of a tractor having a post auger affixed to a three-point hitch thereof can only remove the post auger from the hitch with great difficulty. First, the point of the auger shaft is lowered to the ground to support the auger on the ground. When the point of the auger shaft is placed on the ground, the tension in the central lift arm may be removed by deftly raising and lowering the three-point hitch until the pin becomes loose on the central lift arm wherein the pin may be removed therefrom. In order to safely remove the pin from the central lift arm and disengage the central lift arm from the boom of the post auger, the operator must turn off the engine, climb down from the tractor seat, remove the pin and move the central lift arm laterally from the boom. Then the operator must re-mount the tractor seat, start the engine and back the tractor thereby folding the auger shaft underneath the yoke until the auger shaft lies upon the ground. Folding the auger beneath the yoke puts a strain upon the coupling sleeve of the power take off drive shaft oftentimes resulting in splitting the coupling sleeve. Again, the operator must deftly raise and lower the three-point hitch until the pins joining the trailing arms to the yoke become loose on the trailing arms so that the pins may be removed therefrom. The operator must then again switch off the engine, exit the tractor seat and remove the trailing arms from the post auger and disengage the power take off shaft. Generally, the post auger is left outside lying upon the ground as it is difficult to properly maneuver the tractor with the post auger mounted thereon into a building and place the post auger on the floor of the building. Furthermore, as will become readily apparent, remounting the post auger to the tractor inside a building is also nearly impossible as the auger will merely slide along the floor when attempting to raise the auger shaft to a vertical position for attaching the central lift arm or third link to the boom.

Reinstalling the post auger to the three-point hitch is equally difficult. First, the operator of the tractor must back the tractor to the position where the post auger was last unattached, align at least one trailing arm within about two inches of one side of the yoke and most preferably precisely align both arms with both side pins on the yoke. Maneuvering the tractor with such precision to the location of the post auger usually requires several back and forth moves with the tractor consuming considerable time. The trailing arms must then be lowered to positions close to the yoke pins which may also require leaving the tractor engine operating in order to raise and lower the trailing arms for more precise alignment with the pins resulting in unsafe tractor operating practices. Once the pins are closely aligned with trailing arms, the operator must turn off the engine and exit the tractor, move each trailing arm laterally to engage the pin on the yoke on that side and thereafter move to the other side of the post auger and place the second trailing arm on the respective pin on the yoke. The third point of the hitch is not yet connected to the boom which requires the operator to mount the tractor seat, restart the engine, engage the tractor in forward motion and drag the auger shaft along the ground until the point of the auger digs into the ground raising the post auger to an upright position with the auger shaft substantially vertical. This operation raises the boom hitch point toward the third point of the hitch however, great skill is required to exactly align the hitch point on the boom with the third arm. Usually, the operator exits the tractor seat and rocks the post auger or tractor forward or backward in order to align the holes and place the pin through both the boom and the third arm, this practice again resulting in unsafe tractor operating procedures. Once the post auger is finally affixed to the three-point hitch, the operator must again mount the tractor seat, start the tractor engine if it were turned off when the operator last dismounted and raise the post auger from the ground before moving to a location for drilling. The inaccuracies in alignment using the tractor for aligning often results in pinched fingers, strained muscles or severe injury when attaching the post auger to the tractor.

It is known to provide a portable stand to rollingly support an internal combustion engine for testing. The stand has adjustable supports slidably mounted on the central rail on which the engine is mounted. The entire stand may be moved from one location to another with the engine mounted thereon. There is nothing to suggest that the stand may be used to remove an engine from an automobile or reinstall the same. For instance, see the U.S. Pat. No. 4,848,717 issued on Jul. 18, 1989 to Fred Bevill.

Orlando Pacheco, in his U.S. Pat. No. 4,932,628 issued on Jun. 12, 1990 claims an engine test stand having individual telescopic mounting supports slidable along transverse cross members wherein the cross members may also be moved longitudinally on the edge rails of a rectangular base. As with Bevill, there is no teaching that the test stand could be used to remove an engine from an automobile or reinstall the same.

It is further known to provide a support stand for a snow plow wherein the snow plow stand is generally rectangular and fixed to a base. The stand has a blade stop at the end of the side members and an elevated arm support at the rear end of the stand for supporting the mounting arms of the snow plow. The plow is lifted over the elevated arm, placed against the blade stop and lowered onto the elevated arm. The plow is then disconnected from the plowing vehicle. For instance, see U.S. Pat. No. 5,014,961 issued on May 14, 1991 to William Ferguson. Such a stand cannot be used for a post auger as the elevated arm is fixed and the point of a post auger cannot be lifted over the elevated arm.

Eddie Sodolak, in his U.S. Pat. No. 5,586,743 issued on Dec. 24, 1996 claims a post auger support stand which receives the head of the auger in an U-shaped slot in a support plate mounted above a rectangular base. The trailing arms of the three-point hitch are then lifted by a cross arm mounted at the front of the frame. The cross arm is raised and lowered with hand cranks at the ends of right and left jacking screws. It is clear that the cross arm must be removed prior to placing the auger on the stand and re-placed on the stand in order to provide for lifting of the trailing arms as the auger point may only be raised about 8 inches above the ground. Sodolak provides a stand for an auger but has no teaching of movement of the stand either with or without the post auger mounted thereon, nor does Sodolak provide any means to adjust for different sized augers.

Finally, it is known to provide an auger stand having telescoping yoke support arms, a series of slots for receiving the point of the auger and a drive line pin for receiving the PTO shaft. The base is an elongated central rail with a front and rear cross member. The front cross member has the telescoping yoke support arms mounted on the ends thereof For instance, see the U.S. Pat. No. 5,678,801 issued on Oct. 21, 1997 to William Billingsley. Billingsley states that the stand is light weight and may be moved, however, the stand cannot be moved once the post auger is placed thereon as it is believed that the mass of the stand is generally more than an average operator can move and the additional mass of the auger makes movement impossible.

SUMMARY OF THE INVENTION

It is clear from the description of the prior art and practice that convenient method of aligning and attaching a post auger to a three-point hitch is needed. Furthermore, the need for a convenient, reliable and safe method of adjusting a post auger stand is suggested from a reading of the prior art.

It is therefore a feature of this invention to provide a post auger storage stand for receiving a post hole digger thereon comprising a transverse base, a longitudinal arm affixed to the transverse base, a moveable yoke support comprising a cross member and upright supports at the opposed ends of the cross member for receiving the yoke of the post auger thereon. The cross member is affixed to a slidable sleeve movable along a longitudinal arm.

Yet another feature of this invention is to provide a post auger stand having a movable yoke support to further have telescoping members adjustable within upright supports, the telescoping members and the movable yoke support comprising a means for adjusting, the telescoping members adapted to adjust the height of the upright supports to establish an initial height for receiving the yoke of the post auger thereon.

Yet another feature of this invention is to provide a post auger stand having a movable yoke support to further have telescoping members adjustable within upright supports wherein each telescoping member has a yoke receiving support saddle on one end thereof.

Still another feature of this invention is to provide a post auger stand having a movable yoke support to further have telescoping members adjustable within upright supports, the telescoping members and the movable yoke support comprising a means for adjusting, wherein the movable sleeve of the means for adjusting is adjustable along the longitudinal arm and adapted to readily adjust the length of the post auger stand to receive different length post augers on the post auger storage stand.

Additionally, a feature of this invention to provide a post auger storage stand for receiving a post hole digger thereon comprising a transverse base, a longitudinal arm affixed to the transverse base wherein the transverse base has surface engaging members affixed thereto to facilitate moving the post auger stand and wherein the longitudinal arm has a steerable axle pivotally mounted adjacent the free end thereof allowing the post auger stand to be readily moved into position under a raised post auger mounted on a tractor and aligned for receiving the post auger on the post auger stand.

In light of the prior art, it is a significant object of this invention to provide a post auger storage stand comprising a transverse base, a longitudinal arm, movable yoke support the movable yoke support further having a pair of adjustable vertical column members for receiving a yoke of a post auger wherein the transverse cross member is affixed to a slidable sleeve, the sleeve movable along the longitudinal arm to adjust for different sized post augers. The post auger stand may also have surface engaging members affixed to the transverse base and on a steerable axle pivotally mounted in the longitudinal arm thus constituting a post auger transport vehicle wherein the post auger stand may be readily moved into position under a raised post auger mounted on a tractor and aligned for receiving the post auger on the post auger stand.

It is another significant object of this invention to provide a post hole auger stand comprising means for receiving the terminal end of an auger of a post hole digger, means for receiving the mounting arms of a yoke of the post hole digger and means for moving the auger stand into position to receive the post hole auger thereon.

Yet another object of this invention is to provide a transport vehicle for receiving a post hole digger thereon wherein the transport vehicle is moved to the tractor holding the post hole digger thereon.

Still another object of this invention is to provide a transport vehicle for receiving a post hole digger thereon wherein the transport vehicle has a means for steering the transport vehicle into position beneath the post hole digger mounted on a tractor.

Additionally, it is an object of this invention is to provide a transport vehicle for a post hole digger having the post hole digger mounted thereon wherein the transport vehicle has a means for steering the transport vehicle into position behind a tractor for affixing the post hole digger to the three-point hitch of the tractor.

Still further it is an object of this invention is to provide a post hole auger transport vehicle comprising means for receiving the terminal end of an auger of a post hole digger and the mounting arms of a yoke of the post hole digger and means for moving the auger transport vehicle into position to receive the post hole auger thereon wherein the means for moving the transport vehicle comprises at least one surface engaging rotatable member for permitting movement of the post hole auger stand to the tractor holding the post hole digger thereon.

Finally, it is an object of this invention to provide a post auger storage stand for receiving a post hole digger thereon, the post auger storage stand comprising a transverse base, a longitudinal arm affixed to the transverse base, a moveable yoke support comprising a cross member and upright supports at the opposed ends of the cross member for receiving the yoke of the post auger thereon, the cross member affixed to a slidable sleeve movable along the longitudinal arm wherein the transverse base has a pair of sockets disposed thereon for receiving upright columns of a post auger head support plate therein.

DESCRIPTION OF THE PREFERRED EMBODIMENTS

While the various features of this invention are hereinafter described and illustrated as a post hole digger transport vehicle comprising means for receiving the terminal end of an auger of a post hole digger, means for receiving the mounting arms of a yoke of the post hole digger and means for moving the transport vehicle into position to receive the post hole digger thereon, it is to be understood that the various features of this invention can be used singly or in various combinations thereof to construct and utilize a post hole digger transport vehicle as can hereinafter be appreciated from a reading of the following description.

Referring now to FIGS. 1, 2, 3 and 5, there is shown a post auger transport vehicle having a post hole digger mounted thereon, the post auger transport vehicle generally referred to by the numeral 10 and the post hole digger generally referred to with the number 75. Transport vehicle 10 comprises a post auger storage stand 110 for receiving post hole digger 75 thereon, post auger storage stand 110 comprising a transverse base 11, a longitudinal arm 12 affixed to transverse base 11, a moveable yoke support 30 comprising a cross member 14 and upright support columns 15 at the opposed ends 57, 58 of cross member 14 for receiving the yoke 79 of post hole digger 75 thereon. Cross member 14 is affixed to a slidable sleeve 13 movable along longitudinal arm 12. Post auger storage stand 110 has a means 66 for receiving post hole digger 75 thereon, means 66 for receiving comprising an auger point socket 26 for receiving the point 78 of the auger 77 of post hole digger 75 therein and a pair of yoke receiving saddles 17 for receiving yoke 79 of post hole digger 75. Auger point receiving socket 26 is associated with a transverse base member 11 of post auger storage stand 110 and may be disposed into a top surface 46 but may also be disposed on top surface 46 or otherwise associated with transverse base member 11. Yoke receiving saddles 17 are disposed remote from auger point receiving socket 26 and are preferably associated with an upper end 68 of telescoping members 16 disposed in upright support columns 15.

Figure 5:
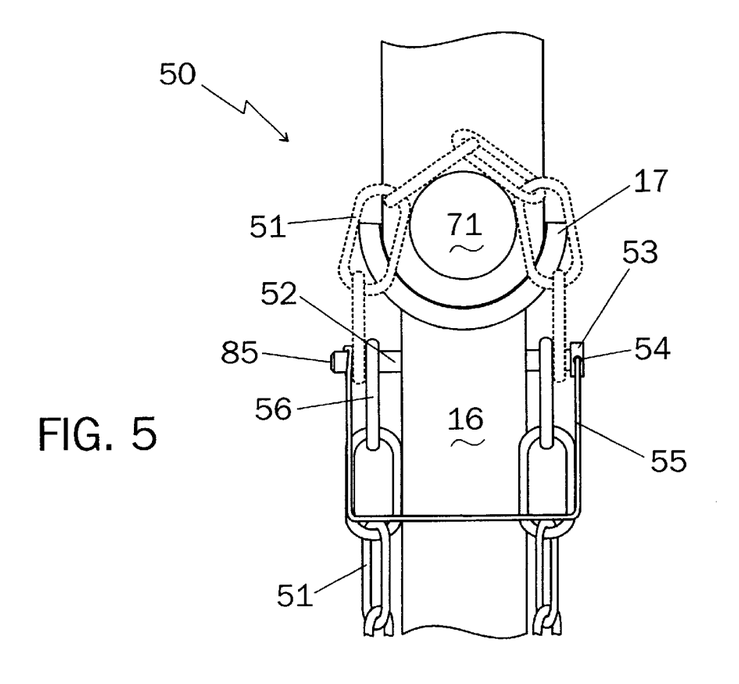
FIG. 5 is an enlarged view of one of the yoke pin supports showing a means for securing of the yoke pin to the transport vehicle of this invention.

Post auger transport vehicle 10 also comprises a means 84 for moving post auger storage stand 110 into position to receive post hole digger 75 thereon and hence is adapted to be moved upon a supporting surface 101 from a storage location which may be within a building to a location immediately behind a tractor 80, only partially shown, wherein tractor 80 has a three-point hitch for receiving, carrying and controlling post hole digger 75. Preferably, means 84 for moving comprises at least one surface engaging member 86 such as wheels 87 disposed on axles 22 extending from transverse base 11, a steering mechanism 31 and at least one surface engaging member 86 on a steerable axle 18 pivotally mounted adjacent free end 28 of longitudinal arm 12, these portions fully described hereinafter. The three-point hitch of tractor 80 comprises two trailing arms 82 and a central lift arm 81, each arm 81, 82 having a pin location adjacent a terminal end thereof Yoke 79 of post hole digger 75 is adapted to be mounted to trailing arms 82 wherein pins 71 protruding from yoke 79 are received in gimbal bearings at the pin location of arms 82. Post hole digger 75 has a boom 74 which is adapted to be removably attached to central lift arm 81 with a separate pin 98 passed in the direction of arrow 59 through a hole in boom 74 and the pin location at the terminal end of central lift arm 81. Once post hole digger 75 is affixed to arms 81, 82, post hole digger 75 may be raised from yoke support saddles 17 and from an auger point receiving socket 26 on post hole storage stand 110 of transport vehicle 10 and moved by tractor 80 to a location for drilling post holes. It will become readily apparent from a reading of the following description that even an operator 100 of small stature may move post hole digger 75 on transport vehicle 10 from a storage location to tractor 80 and install post hole digger 75 upon tractor 80 without assistance and may also easily and safely remove post hole digger 75 from tractor 80 by mounting post hole digger 75 on post auger storage stand 110 of transport vehicle 10. For instance, still referring to FIG. 1, an operator 100 is shown moving post auger transport vehicle 10 with post hole digger 75 thereon to tractor 80 by placing one hand on yoke 79 or saddle 17 and the other hand on a grip 33 of a steering handle 19 of a steering mechanism 31 of transport vehicle 10. By pushing on yoke 79, transport vehicle 10 may be moved toward tractor 80 and steered into exact alignment with trailing arms 82 with steering mechanism 3 1. When desired to store post hole digger 75 and use tractor 80 for other purposes, operator 100 may remove post hole digger 75 from tractor 80 by steering transport vehicle 10 in a position under a raised post hole digger 75, lower auger point 78 of post hole digger 75 into post auger point receiving socket 26, lower trailing arms 82 so that yoke 79 rests upon saddles 17, remove trailing arms 82 from pins 71 securing same to saddles 17 with means 50 for securing, remove separate pin 98 holding boom 74 lo central lift arm 81, rock post hole digger 75 away from tractor 80 and secure boom safety chain 69 to boom 74 by tightening turnbuckle 73. As shown in solid lines in FIG. 5, means 50 for securing yoke 79 to saddles 17 comprises a safety chain 51 and a securing pin 52 having a retaining bail 55 rotatably mounted in a bail mount hole 54 in head 53 of pin 52 wherein pin 52 receives one link 56 of chain 51 adjacent head 53 on one side of telescoping member 16 and receives another link 56 over the free end 85 of pin 52. Means 50 for securing, shown in dashed lines in FIG. 5, is employed by dismounting link 56 adjacent end 85 from pin 52, looping chain 51 over pin 71 on each saddle 17, replacing link 56 on free end 85 of pin 52 and securing link 56 to pin 52 with a bail 55 placed over terminal end 85. Thereafter, referring also to FIG. 1, transport vehicle 10 may be moved to the storage location by unlocking brake mechanism 40, grasping yoke 79 adjacent saddle 17 with one hand and grip 33 with the other hand pulling transport vehicle 10 away from tractor 80. Once clear of tractor 80, transport vehicle 10 may be pushed or pulled along support surface 101 and steered to a storage location by the one operator 100. Multiple mountings and dismountings from the tractor seat of tractor 80 are thus avoided as auger point 78 and trailing arms 82 may be lowered safely onto means 66 for receiving by lowering point 78 into point receiving socket 26 and yoke 79 onto saddles 17 respectively, by moving the hoist lever on tractor 80 to a lowering position. while standing adjacent transport vehicle 10 as it is not necessary to operate the engine of tractor 80 to lower trailing arms 82.

As post hole auger storage stand 110 is adapted to receive different makes and models of post hole diggers 75, storage stand 110 must be adjusted to receive a particular post hole digger thereon. Therefore, movable yoke support 30 further comprises telescoping members 16, adjustable within upright support columns 15, telescoping members 16 and movable yoke support 30 comprising a means 67 for adjusting wherein telescoping members 16 adjust the height of upright support columns 15 to establish an initial height for receiving yoke 79 of post hole digger 75 thereon and slidable sleeve 13 of yoke support 30 adjusts the. location of yoke support 30 along longitudinal arm 12 to adjust the length of post auger stand 110 to receive different length post hole diggers 75 thereon. For instance, upon placing storage stand 110 at a location behind tractor 80 having post hole digger 75 mounted to the three-point hitch of tractor 80 and raised to an elevated position, auger point 78 is lowered into auger point receiving socket 26 thereby providing an initial support for post auger 77 and auger head 76. Moveable yoke support 30 is then adjusted along longitudinal arm 12 by first loosening securing bolts 25 disposed in at least one wall of slidable sleeve 13 and then sliding yoke support 30 along longitudinal arm 12 such that support saddles 17 are substantially directly below yoke 79 of post hole digger 75. Securing bolts 25 in slidable sleeve 13 may then be tightened against longitudinal arm 12 to prevent movement of slidable sleeve 13 thus establishing a location for movable yoke support 30 for the particular post hole digger 75 to be stored on storage stand 110. Thereafter, securing bolts 25 in each upright support column 15 are loosened from engagement with telescoping members 16 and each telescoping member 16 is moved generally upwardly such that saddle 17 is proximate yoke 79 wherein telescoping member 16 has yoke receiving support saddle 17 on one end 68 thereof Upon achieving a position of saddle 17 immediately beneath yoke 79, securing bolts 25 in upright support columns 15 are tightened against telescoping members 16 readying saddles 17 to receive yoke 79 thereon. Yoke 79 is then lowered onto saddles 17 removing the weight of post hole digger 75 from trailing arms 82 wherein trailing arms 82 are then removed from yoke 79 of post hole digger 75. Preferably, yoke receiving support saddle 17 has means 50 for securing yoke 79 of post hole digger 75 upon saddle 17 then employed to secure yoke 79 to saddles 17 as described above. With the weight of post hole digger 75 now resting upon post hole auger storage stand 110, link pin 98 is removed from boom 74 and central lift arm 81. Post hole digger 75 is then rocked away from tractor 80 pivoting upon point 78 and yoke 79 such that auger point 78 wedges against the edge of receiving socket 26. Turnbuckle 73 of boom chain 69 is then secured to boom 74 to assist in holding post hole digger 75 in the rocked back position thus allowing safe movement of post hole digger 75. Drive shaft 83 is then removed from the power take off shaft of tractor 80 and secured to yoke 79 with a means 97 for supporting wherein means 97 for supporting may be a stretchable element having a hook on at least one end thereof. Other elements may, of course, be used as means 97 for supporting, however, it has been found that a bungee cord is easy to use and effectively retains drive shaft 83 upon yoke 79.

Figure 1:
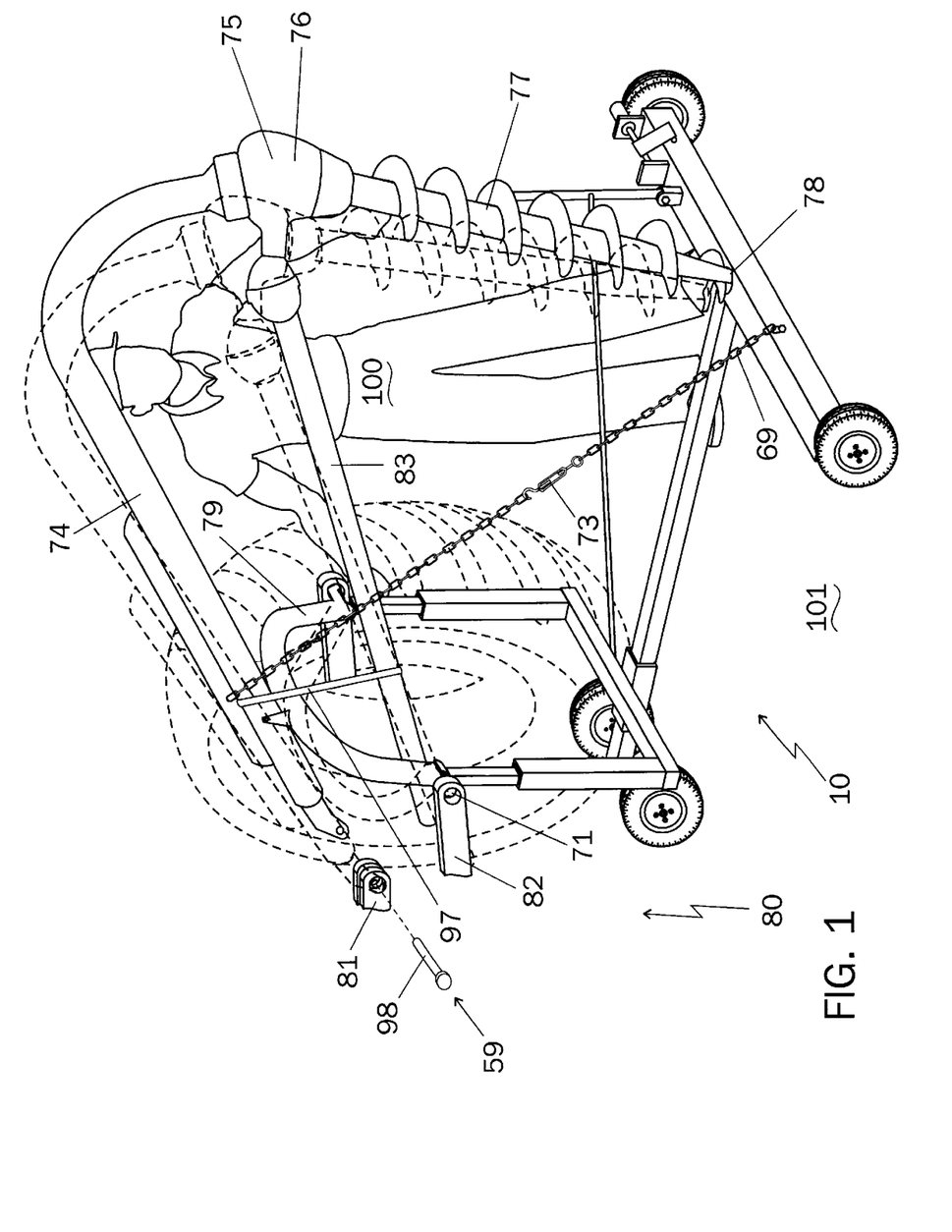
FIG. 1 is a perspective view of the transport vehicle having a post auger engaged thereon shown moved by an operator into position for attachment of the post auger to a three-point hitch of a tractor with a phantom showing of the post auger fully attached to the tractor.
Figure 2:
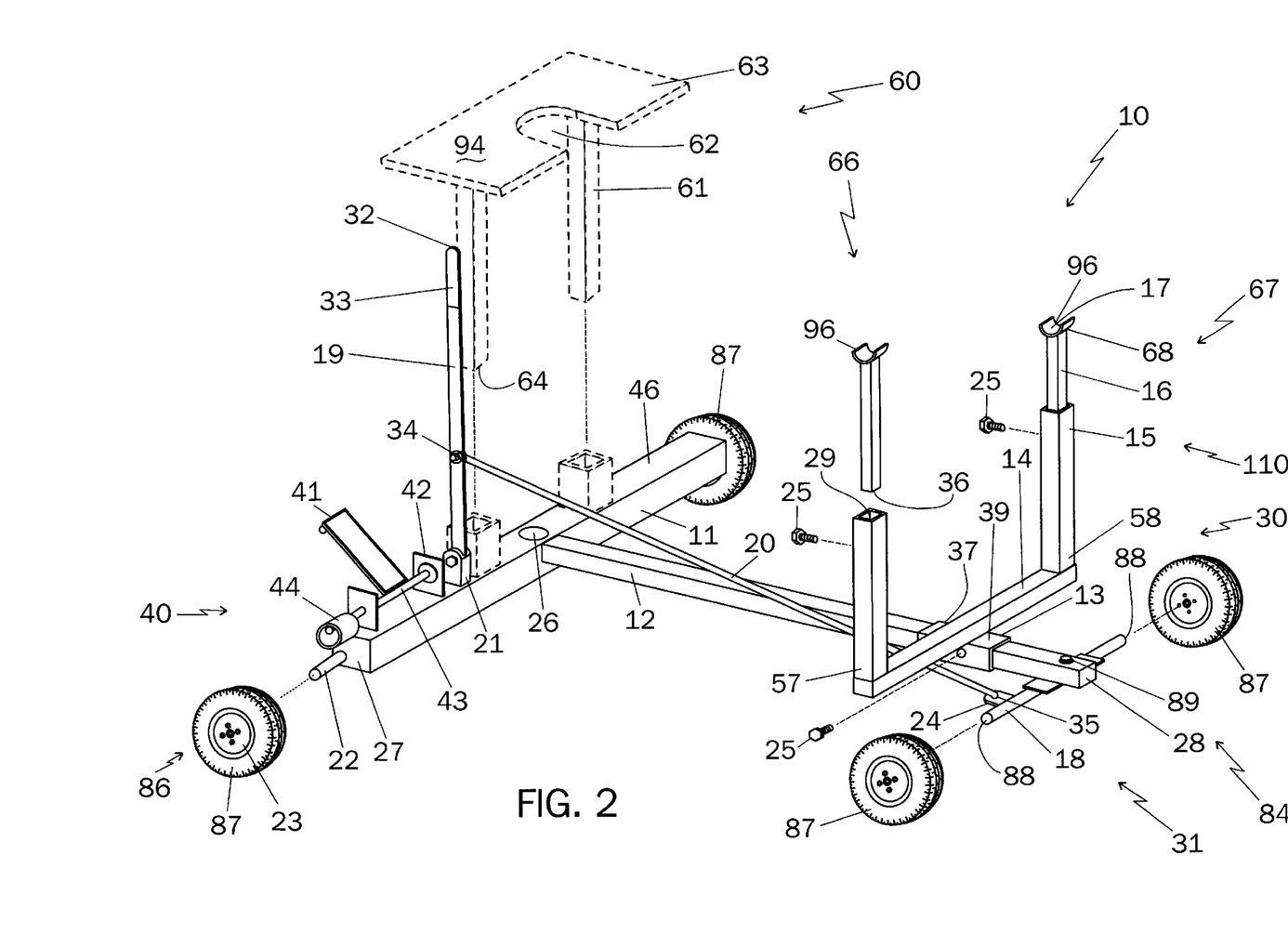
FIG. 2 is a partially exploded perspective view of the transport vehicle of this invention showing an alternate mount for the post auger in phantom.

Preferably, post auger storage stand 110 has means 84 for moving associated therewith enabling storage stand 110 to be readily and safely moved from one location to another. For instance, transverse base 11 of post auger storage stand 110 has surface engaging members 86 associated therewith to facilitate moving post auger storage stand 110 and also has a steerable element associated therewith such that post auger storage stand 110 may be guided along support surface 101 toward or from a storage location. Surface engaging members 86 may be wheels 87 as shown in FIGS. 1 and 2 however, it is fully understood that surface engaging members 86 may be skid like elements or rotatable balls within ball sockets. Where skids or rotatable ball/sockets are used for surface engaging members 86, these elements are generally disposed on the side of transverse base 11 opposite surface 46 such that surface engaging members 86 are disposed between post auger storage stand 110 and support surface 101. For instance, skids (not shown) may be affixed to the surface opposite surface 46 such that storage stand 110 may be moved along support surface 101 by sliding storage stand 110 upon these skids. Where skids are used on transverse base 11, another skid may be associated with end 28 of longitudinal arm 12 wherein the skid is disposed on the underside surface of longitudinal arm 12. Preferably, this skid may be disposed in a rotatable socket and having a steerable element associated therewith for free end 28 of longitudinal arm 12. In another instance, ball-in-socket elements (not shown but well known in the art) may be disposed on transverse base 11 and on end 28 of longitudinal arm 12 wherein these ball-in-socket elements are all steerable elements allowing post auger storage stand 110 to be moved in any direction by pushing or pulling on upright support columns 15 of storage stand 110 or post hole digger 75 when mounted thereon. Ball-in-socket elements are best used on surface 101 which is a smooth surface such as a garage or workshop concrete floor or concrete implement pad. Most preferably, means 84 for moving comprises wheels 87 disposed on axles 22 extending from transverse, base 11 and on a steerable axle 18 pivotally mounted adjacent free end 28 of longitudinal arm 12 allowing post auger storage stand 110 to be readily moved into position under raised post digger 75 mounted on tractor 80 and aligned for receiving post digger 75 on post auger stand 110. When surface engaging elements 86 are associated with post hole auger storage stand 110 as shown in FIGS. 1 and 2 or as described above, post auger storage stand 110 comprises post hole auger transport vehicle 10 comprising means 66 for receiving auger point 78 of auger 77 of post hole digger 75 and mounting arms of yoke 79 of post hole digger 75 and means 84 for moving post auger storable stand 110 into position to receive post hole digger 75 thereon.

In the preferred embodiment, means 84 for moving transport vehicle 10 comprises at least one surface engaging member 86, such as rotatable member 23 for permitting movement of post hole auger stand 110 over a variety of support surfaces 101 to tractor 80 holding post hole digger 75 thereon. Specifically, rotatable member 23 comprises a wheel 87 mounted on an axle 22 affixed to transverse base member 11 of post auger transport vehicle 10 and preferably comprises a wheel 87 mounted on each closed end 27 of transverse base member 111 and/or at least one wheel 87 mounted on a steerable axle 18 rotatably mounted adjacent one end 28 of longitudinal arm 12 of post auger transport vehicle 10. Though wheels 87 may be of any suitable construction, it has been found by the inventor of the instant invention that a pneumatic tire is best suited for wheels 87 as ;a pneumatic tire rolls easily over crushed rock driveways, grasslands, earthen floors and drives as well as concrete and asphalt surfaces. Wheels 87 preferably also have needle or ball bearing axle mounts to enhance rotation of wheels 87 on axles 18, 22. A pneumatic tire for wheel 87 also accepts action of brake mechanism 40 as will hereinafter be fully explained. Continuing to refer to FIGS. 1 and 2, means 84 for moving also comprises steerable axle 18 with rotatable members 23 rotatably mounted thereon permitting transport vehicle 10 to be maneuvered into position beneath post hole digger 75 mounted on tractor 80 or alternately permits post auger transport vehicle 10 having post hole digger 75 mounted thereon to be maneuvered into position behind tractor 80 for affixing post hole digger 75 to the three-point hitch of tractor 80. Specifically, rotatable members 23 comprise wheels 87 substantially the same size as wheels 87 on transverse base 11 and thus are also pneumatic tires with needle or ball bearing axle mounts. Wheels 87 are preferably mounted at opposed ends 88 of axle 18 against a bearing stop wherein wheel 87 is retained on axle 18 by any suitable means. Axle 18 is pivotally mounted adjacent end 28 of longitudinal arm 12. and preferably is pivotally mounted in a bearing or bushing 89 disposed through longitudinal arm 12 wherein axle 18 is retained in bushing 89 by any suitable means. Axle 18 is shown as having one(wheel 87 on each end 88 thereof as is preferred, however axle 18 could be a single forked mount containing a single wheel 87 yet be rotatably mounted in bushing 89 as is conventional in the art. It is readily apparent that means 84 for moving also has steering mechanism 31 associated therewith and specifically has one end of a steering shaft 20 pivotally engaged with axle 18. Steering shaft 20 has an axle link 35 at one end thereof disposed through a hole in an axle bracket 24 wherein axle bracket 24 is fixedly retained on axle 18. Steering shaft 20 then extends away from axle 18 toward transverse base 11 and is pivotally affixed to a steering handle 19 with a handle link 34 wherein steering handle 19 is pivotally mounted to transverse base 11. Specifically, steering handle 19 is movably affixed to transverse base 11 by at least one handle bracket 21 fixed to upper surface 46 of transverse base 11. Preferably, two handle brackets 21 are fixed to transverse base 11 one handle bracket 21 on either side of steering handle 19 such that steering handle 19 is disposed between these two handle brackets 21. A pivotable member is disposed through each handle bracket 21 and steering handle 19 wherein steering handle 19 may be moved about this pivotable member by moving an opposite end 32 of steering handle 19 in a fore and aft movement using a grip 33 on grip end 32 thereof. Handle link 34 is disposed between handle brackets 21 and grip end 32 at a distance from handle brackets 21 determined by the desired steering ratio between movement of steering handle 19 at grip end 32 and angular displacement of steering axle 18 about bushing or bearing 89. By using steering mechanism 31 of means 84 for moving in conjunction with surface engaging members 86, post auger transport vehicle 10 may be moved to any location desired by operator 100 by gripping handle grip 33 with one hand and saddle 17 or yoke 79 when mounted on saddle 17 and pushing or pulling on saddle 17 or yoke 79 while steering transport vehicle 10 with steering mechanism 31.

Figure 3:
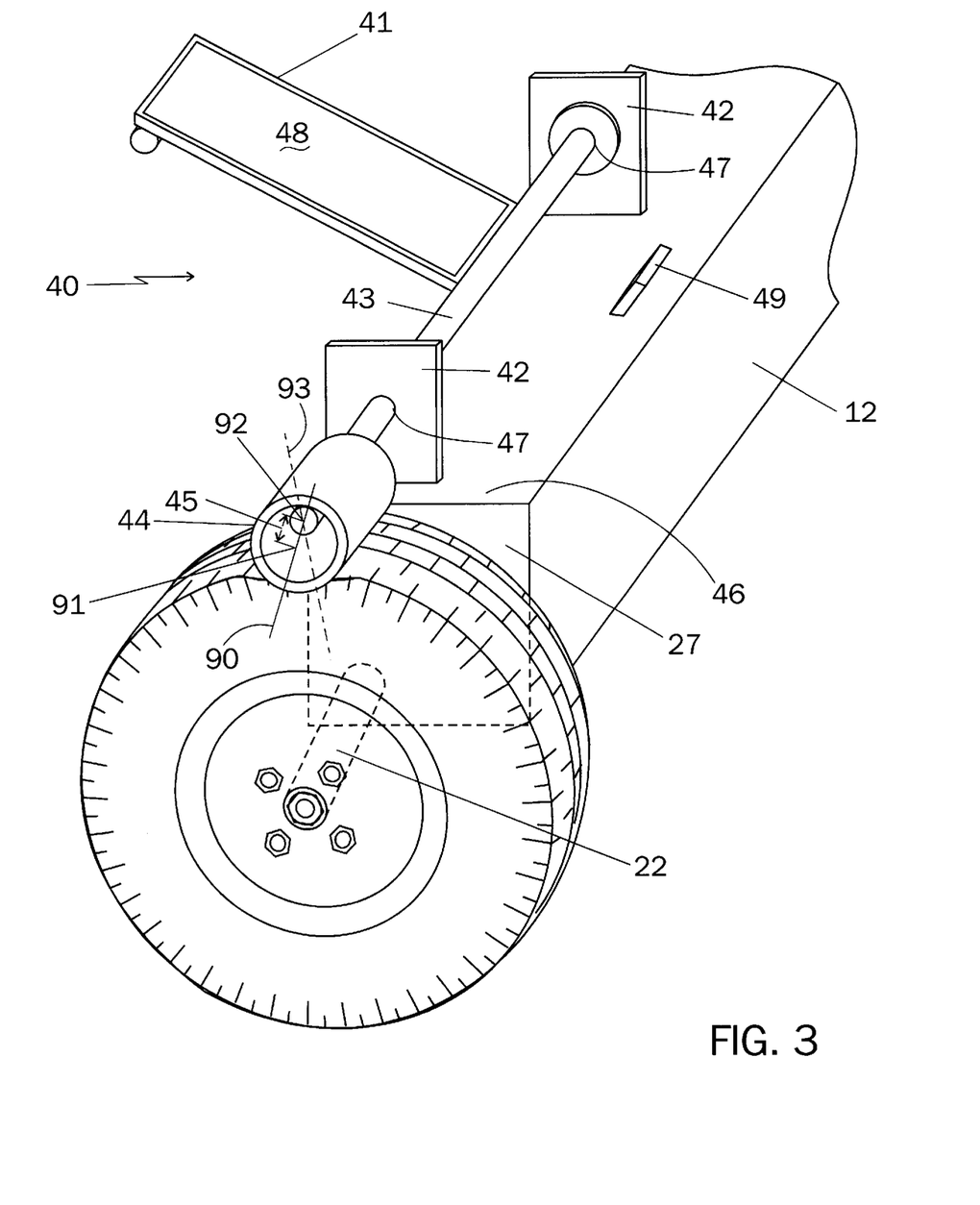
FIG. 3 is an enlarged perspective view of the wheel brake of the transport vehicle of this invention.

When operator 100 has transport vehicle 10 in the desired location, transport vehicle 10 may be retained in that position by brake 40. Brake 40 comprises brake pedal 41, at least one brake mount bracket 42, a brake shaft 43, a tire engaging stop 44, an eccentric offset 45 and a pedal stop 49. Preferably two brake mount brackets 42 are affixed to top surface 46 of transverse base 11 adjacent one closed end 27 thereof, brake mount brackets 42 spaced apart at least a distance equal to the width of brake pedal 41. Brake pedal 41 is fixed to brake shaft 43 between brake mount brackets 42 with shaft 43 disposed through aligned brake shaft holes 47 in each of brake mount brackets 42. Disposed outwardly from one brake mount bracket 42, preferably a brake mount bracket 42 disposed at closed end 27 is tire engaging stop 44. Tire engaging stop 44 is fixed to shaft 43 outboard of bracket 42 and is eccentrically mounted on shaft 43 such that tire engaging stop 44 may be forced against a pneumatic tire on wheel 87. Specifically, tire engaging stop 44 has shaft 43 affixed to an inside diameter of tire engaging stop 44 such as shaft 43 rotates by action of brake pedal 41, center 91 of tire engaging stop 44 pivots about center 92 of shaft 43. Thus, eccentric offset 45 is defined as the distance between centers 91, 92 of tire engaging stop 44 and shaft 43 respectively. As shown in FIG. 3, tire engaging stop 44 is shown engaged with wheel 87 depressing the surface thereof and brake pedal 41 has moved shaft 43 "over center" thereby locking wheel 87 to transverse base 11 through tire engaging stop 44. The "over center" condition exists when centerline 90 between centers 91 and 92 passes beyond a centerline 93 between shaft 43 and axle, 22. By depressing the surface of wheel 87, wheel 87 is prevented from rotating about axle 22 thus retaining transport vehicle 10 in a fixed position relative to support surface 101. When brake, pedal 41 is lifted so that tire engaging stop 44 pivots away from wheel 87, wheel 87 assumes a fully rounded shape and may easily roll as stop 44 has been removed therefrom. Referring to the dashed lines in FIG. 3, it is observed that tire engaging stop 44 has been lifted from wheel 87 as center 91 of tire engaging stop 44 has pivoted about center 92 of shaft 43 wherein surface 48 of brake pedal 41 rests against pedal stop 49. Brake 40 is employed when transport vehicle 10 is positioned under post hole digger 75 while post hole digger 75 is still mounted on tractor 80, as shown in phantom view in FIG. 1, thus safely holding transport vehicle 10 in position under post hole digger 75. When auger point 78 has been lowered into engagement with socket 26 and yoke 79 has been lowered into saddles 17 and secured thereto, brake 40 retains transport vehicle 10 in a solid position such that when post hole digger 75 is tilted away from tractor 80 as shown in full view in FIG. 1, transport vehicle 10 remains stationary. Brake pedal 41 may have a textured surface on surface 48 to ensure that the foot of operator 100 does not slip on surface 48.

Once turnbuckle 73 of boom chain 69 has been attached to boom 74 and tightened, brake 40 may be released to allow operator 100 to move transport vehicle 10 with post hole digger 75 thereon away from tractor 80 and into a storage position. Brake 40 may then again set into engagement with wheel 87 when transport vehicle 10 is fully parked in its storage position to retain transport vehicle 10 in that location. As transport vehicle 10 is easily movable by releasing brake 40 and moving transport vehicle 10 by means 84 for moving, repositioning of transport vehicle 10 in a storage building may easily be effected thus freeing up space within the storage building for other uses. It is readily apparent that transport vehicle 10 for post hole digger 75 may be altered to accept other three-point hitch mounted implements and may also be adapted for storage of vehicle mounted snow plows, these implements therefore also movable about in a storage building without employing overhead hoists or reattaching the implement to the carrying vehicle merely to move the implement to another location.

Figure 4:
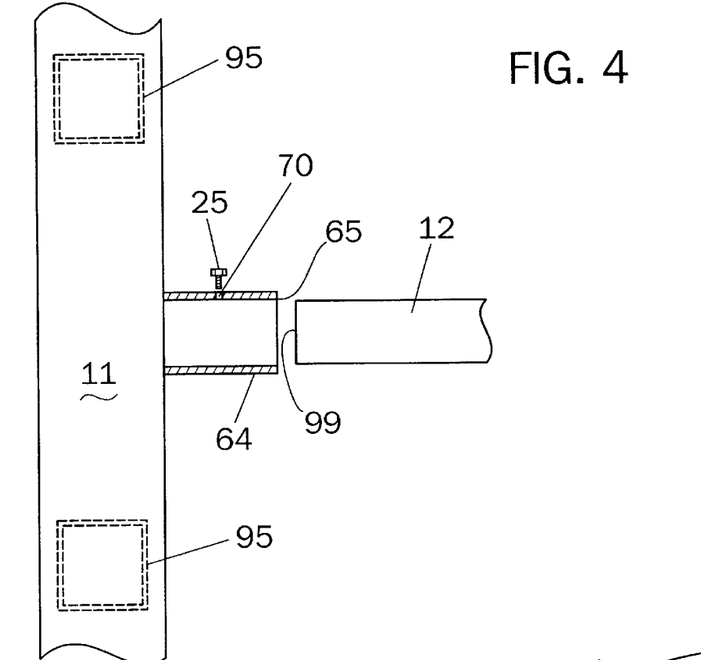
FIG. 4 is an enlarged view of an alternate construction of the juncture between the longitudinal arm and the transverse base or for mounting the alternate mount to the transverse base of the post auger transport vehicle of this invention.

Referring now to FIGS. 2 and 4, an alternate post auger storage stand 110 for receiving a post hole digger 75 thereon comprises transverse base 11, longitudinal arm 12 affixed to transverse base 11, moveable yoke support 30 comprising a cross member 14 and upright support columns 15 at opposed ends 57, 58 of cross member 14 for receiving yoke 79 of post hole digger 75 thereon wherein cross member 14 is affixed to slidable sleeve 13 movable along longitudinal arm 12 and wherein transverse base 11 has means 60 for receiving the head 76 of post hole digger 75 on an elevated plate 63 fixedly mounted above transverse base 11. Means 60 for receiving head 76 of post hole digger 75 further comprises a longitudinal slot 62 disposed in elevated plate 63 wherein the auger end of head 76 is adapted to rest on upper surface 94 of elevated plate 63 having auger 77 depending downwardly from head 76. Elevated plate 63 is suspended above transverse base 11 by at least two column members 61 which are affixed to transverse base 11. In one embodiment of this alternate post auger storage stand 110, columns 61 are received in support sockets 95 which are affixed to upper surface 46 of transverse base 11. Where support sockets 95 are used, securing bolts 25 are usually disposed through at least one wall of support socket 95 to removably affixed column 61 thereto. Preferably, in this alternate embodiment, columns 61 are directly affixed to upper surface 46 of transverse base 11 as this produces a post auger storage stand 110 of sturdy construction. As with post auger storage stand 110 of the preferred embodiment, alternate post auger storage stand 110 has surface engaging members 86 affixed to at least transverse base 11 to facilitate moving post auger stand 110 and also has steerable axle 18 pivotally mounted adjacent free end 28 of longitudinal arm 12 thus allowing post auger storage stand 110 to be readily moved into position under a raised post hole digger 75 mounted on tractor 80 and aligned for receiving post hole digger 75 on post auger storage stand 110. Therefore, an alternate embodiment of transport vehicle 10 having an elevated plate 63 with a slot 62 therein for receiving head 76 of post hole digger 75 is constructed and may be used to mount and dismount post hole digger 75 onto or off from tractor 80.

In like manner, as shown in FIG. 4, longitudinal arm 12 may be affixed to transverse base 11 using a socket 64 having at least one securing bolt 25 disposed through one wall thereof In this embodiment, longitudinal arm 12 is not rigidly affixed to transverse base 11 but rather has one end 99 opposite free end 28 placed into an opening 65 in socket 64. When fully emplaced in socket 64, securing bolt 25 is disposed through threaded hole 70 in at least one wall of socket 64 and engaged against the outer surface of at least one wall of longitudinal member 12. As longitudinal member 12 may be removed from socket 64 and movable yoke support 30 may also be removed from longitudinal arm 12, a compact storage or shipment of post hole auger storage stand 110 may be effected. Similarly, as rotatable members 23 may be removed from axles 18 and 22 and steering mechanism 31 may be disassembled, longitudinal arm 12 and steering shaft 20 may be placed on one flat side of transverse base 11 with movable yoke support 30 also disposed thereon and aligned longitudinally with transverse base 11 while rotatable members 23, handle 19 and steering axle 18 of steering mechanism 31 are placed within the confines of upright support columns 15 for storage or shipment of disassembled transport vehicle 10.

In a method of making post auger stand 110 of this invention, a four-inch box beam approximately four feet in length has both ends closed such as by welding a solid plate over ends 27 thereof the four-inch box beam thereby constituting transverse base 11 of post hole auger stand 110. Socket 26 is then formed as a three-inch diameter hole into upper surface 46 of transverse base 11 centrally located between ends 27 although socket 26 may be formed from a three-inch diameter length of pipe and welded to upper surface 46. Longitudinal arm 12 is formed from a five-foot long length of two inch box beam and has one end 28 closed by welding a solid plate over end 28 while the end opposite end 28 is preferably welded to transverse base 11 on a side adjacent upper surface 46 and centrally located between ends 27. Movable support member 30 comprises a slidable sleeve 13, upright support columns 15, cross member 14 and telescoping members 16. Slidable sleeve 13 is formed from a short section of two and one-half inch box beam and preferably is about 8 inches in length. Slidable sleeve 13 has at least one threaded hole disposed through one side 37 thereof for receiving a securing bolt 25. Securing bolts 25 used throughout post hole auger storage stand 110 are preferably ½-12 UNC hex head bolts approximately one inch in length. Cross member 14 is welded to a side 39 of slidable sleeve 13 adjacent to side 37 and approximately centrally located along the length of slidable sleeve 13, cross member 14 also constructed of two inch box beam approximately two feet in length, the length of cross member 14 selected to accommodate the distance between the downwardly projecting portions of yoke 79. Upright support columns 15 are also constructed of two inch box beam and are about one and one-half feet in length and have threaded holes disposed through at least one side thereof adjacent open end 29 thereof, the threaded holes adapted for receiving securing bolts 25. Upright support columns 15 are preferably welded to ends 57, 58 of cross member 14 such that the distance between centers thereof is about two feet. Specifically, the distance between centers of upright support columns 15 is 22⅞ inches and the length over outside edges 96 of saddles 17 when telescoping members 16 are disposed within upright support columns 15 is approximately 26 inches. Telescoping members 16 are preferably constructed of one and one half inch box beam and are also about one and one-half feet in length so selected to have bottom end 36 thereof telescopically received within open end 29 of upright support columns 15 although telescoping member 16 may also be constructed of a box beam larger than upright support columns 15 and be telescopically received over upright support columns 15. Telescoping members 16 have U-shaped saddles 17 welded to one end 68 thereof, saddles 17 constructed of a three-inch long section of 2½ inch diameter Schedule 40 pipe split length wise in two halves thereby forming both saddles 17 for both telescoping members 16. The inside diameter of the 2½ inch pipe readily accepts the rounded bottom portion of yoke 79. Saddle 17 is preferably coated with an elastomeric coating to protect yoke 79 as well as saddle 17. Transverse base 11 may have an elastomeric substance disposed around socket 26 to provide for protection of upper surface 46 of transverse base 11. Movable support member 30 is disposed on longitudinal arm 12 by disposing slidable sleeve 13 over free end 28 of longitudinal arm 12 as slidable sleeve 13 is selected to have its internal dimensions fit closely over the external dimensions of longitudinal arm 12. Movable support member 30 may then be movably affixed to longitudinal arm 12 by securing at least one of bolts 25 in slidable sleeve 13 against an outside surface of longitudinal arm 12. Thus, post auger support stand 110 is created wherein post auger support stand 110 may receive post hole digger 75 thereon in a location selected by an operator 100 of tractor 80 though it is desirable to be able to readily relocate post auger support stand 110.

Post hole auger support stand 110 may have at least one surface engaging member 86 affixed thereto to provide for means 84 for moving post hole auger support stand 110. Preferably, means 84 for moving comprises wheels 87 affixed to axles 22 and 18 on transverse base 11 and longitudinal arm 12 respectively. Thus, at least one axle 22 is formed from a length of solid rod wherein one axle 22 is welded to each closed end 27 of transverse base 11, axle 22 adapted to receive a wheel 87 thereon, wheel 87 being fixedly retained on axle 22. Axle 18 is formed of a second section of solid rod and has wheel mounts on opposite ends 88 thereof. Axle 18 has a central pivot plate with a pivot post affixed thereto, the pivot post adapted to be received in a steering bushing 89 disposed vertically through longitudinal arm 12 adjacent end 28. Axle 18 is preferably a steerable axle and therefore has an axle bracket 24 formed as a D-shaped flat plate affixed adjacent one end 88 thereof axle bracket 24 having a link hole disposed therethrough for receiving link 35 of a steering shaft 20. Bracket 24 is preferably welded to axle 18 such that bracket 24 is disposed toward transverse base 11. Transverse base 11 then has at least one handle bracket 21 formed as D-shaped flat plate with the base of the D-shaped flat plate welded to upper surface 46 of transverse base 11. Preferably, two D-shaped flat plate handle brackets 21 are welded to surface 46 spaced apart by a distance equal to the thickness of steering handle 19 hingedly affixed between these two handle brackets 21. Handle 19 is formed from a one inch wide, three-eighths inch thick flat plate having a pivot hole adjacent one end thereof, a link hole approximately one-third the length thereof spaced from the pivot hole and a grip end 32 having a grip 33 thereon. Grip 33 may be a bicycle handle bar grip or may be an elastomeric substance disposed over grip end 32. Steering shaft 20 is formed from a length of solid rod and preferably has handle link 34 formed as a right angle bend on one end of shaft 20 and also has axle link 35 formed as a right angle bend on the other end thereof Links 34, 35 may be fixedly retained in handle 19 and bracket 24 respectively by cap nuts, cotter pins or threaded nuts.

Brake 40 is disposed adjacent one end 27 of transverse base 11 and comprises two D-shaped flat plate brackets 42 welded to top surface 46 spaced apart about 5 inches apart. Brackets 42 have brake shaft holes 47 disposed therethrough in alignment for receiving brake shaft 43 therein. Brake shaft 43 is formed from a length of solid rod and has brake pedal 41 welded to shaft 43 intermediate brackets 42. Brake pedal 41 is an eight-inch long section of ⅜ thick plate and preferably has a tread surface 48. Tread surface 48 may be a grit coating or textured elastomeric substance firmly affixed to brake pedal 41. On an out board end of shaft 43 a two inch long piece of one inch diameter pipe is welded to shaft 43, the one inch diameter pipe constituting tire engaging stop 44. As tire engaging stop 44 has an inside surface welded to shaft 43, tire engaging stop 44 is disposed eccentrically from shaft 43 and thereby is adapted to be forced into wheel 87 by the action of brake pedal 41. A brake pedal stop 49 may also be formed from a short section of flat plate and welded to upper surface 46 to support brake pedal 41 thereon when brake 40 is released. By providing means 84 for moving and brake 40 on post auger support stand 110, post auger transport vehicle 10 is formed.

While the p;,resent invention has been described with reference to the above described preferred embodiments and alternate embodiments, it should be noted that various other embodiments and modifications may be made without departing from the spirit of the invention. Therefore, the embodiments described herein and the drawings appended hereto are merely illustrative of the features of the invention and should not be construed to be the only variants thereof nor limited thereto.

I claim:

1. A post auger storage stand for receiving a post hole digger thereon, said post auger storage stand comprising a transverse base, a longitudinal arm affixed to said transverse base, a moveable yoke support comprising a cross member and upright support columns at the opposed ends of said cross member for receiving the yoke of said post auger thereon, said cross member affixed to a slidable sleeve movable along said longitudinal arm.

2. The post auger storage stand as in claim 1 wherein said movable yoke support further has telescoping members adjustable within said upright support columns, said telescoping members and said movable yoke support comprising a means for adjusting, said telescoping members adapted to adjust the height of said upright support columns to establish an initial height for receiving said yoke of said post auger thereon.

3. The post auger storage stand as in claim 2 wherein said each said telescoping member has a yoke receiving support saddle on one end thereof.

4. The post auger storage stand as in claim 3 wherein said each said yoke receiving support saddle has a means for securing said yoke of said post auger upon said saddle.

5. The post auger storage stand as in claim 2 wherein said slidable sleeve of said means for adjusting is adjustable along said longitudinal arm to receive different length post augers on said post auger storage stand.

6. The post auger storage stand as in claim 1 wherein said transverse base has surface engaging members affixed thereto to facilitate moving said post auger storage stand.

7. The post auger storage stand as in claim 1 wherein said longitudinal arm has a steerable axle pivotally mounted adjacent the free end thereof allowing said post auger storage stand to be readily moved into position under a raised post auger mounted on a tractor and aligned for receiving said post auger on said post auger storage stand.

8. The post auger storage stand as in claim 1 wherein said transverse base has a socket for receiving the point of the auger of said post auger therein.

9. The post auger storage stand as in claim 1 wherein said transverse base has a pair of sockets disposed thereon for receiving upright columns of a post auger head plate therein.

10. The post auger stand as in claim 1 wherein said longitudinal arm has a steerable axle pivotally mounted adjacent the free end thereof allowing said post auger stand to be readily moved into position under a raised post auger mounted on a tractor and aligned for receiving said post auger on said post auger stand.

11. A post hole auger transport vehicle comprising means for receiving the terminal end of an auger of a post hole digger and the mounting arms of a yoke of said post hole digger and means for moving said auger transport vehicle into position to receive said post hole auger thereon, said means for moving said transport vehicle comprising at least one surface engaging rotatable member for permitting movement of said post hole auger transport vehicle to a tractor having said post hole digger mounted thereon, said at least one surface engaging rotatable member comprising at least one wheel mounted on a steerable axle rotatably mounted adjacent one end of a longitudinal member of said post auger transport vehicle.

12. The post auger transport vehicle as in claim 11 wherein said steerable axle permits said transport vehicle to be maneuvered into position beneath said post hole digger mounted on a tractor.

13. The post auger transport vehicle as in claim 11 wherein said steerable axle permits said post auger transport vehicle having a post hole digger mounted thereon to be maneuvered into position behind a tractor for affixing said post hole digger to the three-point hitch of said tractor.

14. The post auger transport vehicle as in claim 1 wherein said means for receiving said post hole digger comprises an auger point socket for receiving the point of the auger of said post hole digger therein, said socket associated with a transverse base member of said post auger transport vehicle and a pair of yoke receiving saddles for receiving the yoke of said post hole digger, said yoke receiving sockets disposed remote from said auger point receiving socket.

15. A post auger storage stand for receiving a post hole digger thereon, said post auger storage stand comprising a transverse base, at least one longitudinal arm affixed to said transverse base, a moveable yoke support comprising a cross member and upright support columns at the opposed ends of said cross member for receiving the yoke of said post auger thereon, said cross member affixed to a slidable sleeve movable along said longitudinal arm said transverse base having a means for receiving the head of a post auger on an elevated plate fixedly mounted above said transverse base.

16. A post auger storage stand as in claim 15 wherein said means for receiving said head of said post auger comprises a longitudinal slot disposed in said plate.

17. A post auger storage stand as in claim 15 wherein said transverse base has surface engaging members affixed thereto to facilitate moving said post auger stand.

* * * * *